United States Patent
Maugras

(10) Patent No.: US 6,840,980 B2
(45) Date of Patent: Jan. 11, 2005

(54) METHOD FOR ELIMINATING BISMUTH FROM MOLTEN LEAD BY ADDING CALCIUM-MAGNESIUM ALLOYS

(75) Inventor: Cyprien Maugras, Paris (FR)

(73) Assignee: SKW la Roche de Rame Sas, La Roche de Rame (FR)

( * ) Notice: Subject to any disclaimer, the term of this patent is extended or adjusted under 35 U.S.C. 154(b) by 147 days.

(21) Appl. No.: 10/239,840

(22) PCT Filed: Apr. 10, 2001

(86) PCT No.: PCT/FR01/01083

§ 371 (c)(1),
(2), (4) Date: Dec. 4, 2002

(87) PCT Pub. No.: WO01/79570

PCT Pub. Date: Oct. 25, 2001

(65) Prior Publication Data

US 2003/0121367 A1 Jul. 3, 2003

(30) Foreign Application Priority Data

Apr. 13, 2000 (FR) .......................... 00 04773

(51) Int. Cl.$^7$ .............................. C22B 13/08
(52) U.S. Cl. ...................................... 75/702
(58) Field of Search .......................... 75/702

(56) References Cited

U.S. PATENT DOCUMENTS 5,041,160 A * 8/1991 Zuliani et al. ................ 75/701

FOREIGN PATENT DOCUMENTS

| EP | 343012 | * | 9/1995 |
| FR | 2514786 | * | 4/1983 |
| FR | 2764905 | * | 12/1998 |
| SU | 378469 | * | 4/1973 |

* cited by examiner

Primary Examiner—Melvyn Andrews
(74) Attorney, Agent, or Firm—Dennison, Schultz, Dougherty & MacDonald

(57) ABSTRACT

A method for eliminating bismuth from molten lead with calcium and magnesium, in which the addition of calcium and magnesium is made in the form of lumps two Mg—Ca alloys, one containing predominantly Mg, the other containing predominantly Ca, each having a liquidus temperature lower than 650° C., and preferably lower than 600° C. A preferred treatment utilizes a first alloy containing 12–25% Ca, close to the eutectic alloy at 16.2% by weight Ca, and a second alloy containing 60-80% Ca. The method enables rapid elimination of bismuth, and adjustment of the Ca/Mg ratio during the treatment.

8 Claims, No Drawings

METHOD FOR ELIMINATING BISMUTH FROM MOLTEN LEAD BY ADDING CALCIUM-MAGNESIUM ALLOYS

FIELD OF THE INVENTION

The invention relates to a molten lead refining method to eliminate bismuth from said molten lead, using calcium and magnesium.

DESCRIPTION OF RELATED ART

The treatment of lead with calcium in order to eliminate bismuth has been known since 1917 and has, since that time, made it possible to reduce the bismuth content to less than 0.05%. Guillaume Kroll's Patent U.S. Pat. No. 1,428,041, filed in 1920, already described the combined use of calcium and magnesium for this purpose and subsequently gave rise to the Kroll-Betterton method, which is still widely used at the present time. It consists of simultaneously adding calcium in lump form and magnesium in ingot form. Experience has shown that the most effective proportion of these two refining agents is approximately ⅓ of calcium to ⅔ of magnesium.

The main problem encountered when introducing these metals into the lead bath lies in the significant difference in their density (1.5 for Ca and 1.7 for Mg) with respect to that of lead (10.5), which tends to keep them on the surface of the bath and induces significant losses due to air oxidation.

One means to decrease the oxidation of calcium and magnesium is to use Mg—Ca alloys. In 1938, the patent U.S. Pat. No. 2,129,445 (American Metal Company) indicated this possibility and particularly described an alloy containing 79.4% magnesium and 20.6% calcium. The patent EP 343012 (Timminco) covers the use, for this application, of an Mg—Ca alloy containing 65 to 75% magnesium, and the addition of this alloy to the lead bath at a temperature between 415 and 500° C., such that the alloy dissolves without melting. The disadvantage of using an alloy of the given composition is that it is not possible to adjust the proportion of reagents during treatment. However, if it is desired to make this adjustment, it is necessary to use pure calcium or magnesium in addition to the alloy.

Another solution to prevent oxidation consists of injecting additives in powder form. The Fench Patent FR 2514786 (Extramet) describes the introduction of calcium and magnesium in the form of a mixture of Ca—Mg alloy granules, by injection via an inert carrier gas. The granules are, preferentially, a mixture of granules of both Mg—Ca phase diagram eutectic alloys (alloys containing 82% and 16.2% Ca). The patent application WO 98/59082 filed by the applicant describes the treatment of lead with a cored wire with a meltable coating containing a mixture of calcium and magnesium powders. The introduction of reagents in the form of a mixture of powders by injection or the cored wire technique does not allow the adjustment of their respective proportion during treatment.

In this way, the aim of the invention is to enable effective elimination of bismuth from lead using calcium and magnesium in low oxidation forms, while retaining the possibility to adjust the Ca/Mg ratio during treatment.

SUMMARY OF THE INVENTION

The invention relates to a method to eliminate bismuth from lead by means of magnesium and calcium, wherein the magnesium and calcium are introduced in the form of lumps of two Mg—Ca alloys, one predominantly Mg and the other predominantly Ca, each having a liquidus point below 650° C., and preferentially 600° C. The liquidus points of the two alloys are preferentially within less than 20° C. of each other. A particularly effective treatment is obtained with an Mg—Ca alloy similar to the eutectic with 16.2% (by weight) of calcium and containing 12 to 25% of calcium, and a Ca—Mg alloy between 60 and 80% of calcium.

DETAILED DESCRIPTION OF THE INVENTION

Trying to combine the advantages of the use of Mg—Ca alloys, essentially an improved oxidation resistance, and that of the use of two separate reagents, i.e. the possibility of adjusting the Ca/Mg ratio during treatment, the applicant first of all had the idea of selecting lumps of alloys of the same composition as those described in FR 2514786, i.e. eutectic compositions containing 16.2 and 82% calcium. The test carried out with these alloys and with alloys of different compositions first of all demonstrated that it was possible to select a certain composition range both for the calcium-poor alloy and for the calcium-rich alloy, provided that the liquidus point remains below 650° C., which is equivalent to less than 30% calcium for the calcium-poor alloy, and a range of 60 to 90% for the calcium-rich alloy. The liquidus point is, preferentially, less than 600° C., or approximately 8 to 25% of calcium for the poor alloy and 67 to 87% for the rich alloy. In fact, the advantage of the alloys is barely noticeable if the calcium or magnesium content becomes too low. In this way, the ranges of effective contents are 12 to 25% for the poor alloy and 60 to 80% for the rich alloy. To obtain comparable behaviour for both alloys, it is preferable to select alloys with a close liquidus point, typically with a difference of less than 20° C.

For the calcium-poor alloy, it is possible to select in the vicinity of the eutectic containing 16.2%, wherein the liquidus point is 516° C. This liquidus point corresponds, for the rich alloy, to approximately 75% calcium. When the lead treatment is carried out by immersing in a metal cage, the pair of alloys defined is well suited, and it is of no interest to deviate too much from it so as not to perform the treatment at an excessively high temperature. It is possible to define an optimal content range of 12 to 20% Ca for the poor alloy and 70 to 77% for the rich alloy.

In addition, the experiments conducted by the applicant demonstrated that the eutectic alloy containing 82% calcium showed a marked tendency to ignite in air, that this tendency decreased with the calcium content, but above all that it disappeared suddenly and unexpectedly for a calcium content of approximately 67%. When the alloys are introduced into the lead in a vortex, this tendency to ignite in air is more of a hindrance, and it is preferable to select a content between 60 and 67% calcium for the rich alloy, resulting in the acceptance of a liquidus point between 600 and 650° C. In this case, it is of interest to deviate slightly from the eutectic composition for the poor alloy, so as not to have an excessively deviant liquidus point, the optimal calcium content range being between 20 and 25%.

It is advantageous for the user that these two alloys come in ingots of different sizes or shapes, so as to recognise them easily. The unit size must be appropriate to obtain the desired proportion between the calcium and magnesium, of the order of ⅓ calcium, easily, and to make the necessary corrections during treatment.

Unlike the disclosure in patent EP 343012 mentioned above, it is observed that these alloys with a lower melting point than alloys containing 30% calcium, which melt in the lead before dissolving, dissolve more quickly, and result in more rapid refining. In addition, contrary to what may have been expected, the simultaneous introduction of two meltable alloys, wherein the average composition corresponds to a non-meltable alloy, does not result in the formation of a solid mass.

EXAMPLES

Example 1

A bath containing 13 kg of molten lead at 480° C., in which 0.2% of bismuth was introduced, was prepared. 44.1 g of calcium lumps and 95.9 g of magnesium ingots cut with a metal saw were added. The reagents were immersed in the lead using a steel cage. The bath was maintained at 480° C. for 4 hours. The temperature was then lowered to 330° C. for 1 hour. The bath was analysed every half hour. The bismuth content changed from 0.2% at the start of the treatment to 0.1% at the end of the 480° C. maintenance period and to 0.01% at the end of the cooling period at 330° C.

Example 2

The same quantity of calcium and magnesium as in example 1 was introduced, but in the form of 140 g of alloy containing, by weight, 33% calcium and 67% magnesium. The bismuth content changed from 0.2% at the start of the treatment to 0.1% at the end of the 480° C. maintenance period and to 0.01% after one hour of cooling at 330° C.

Example 3

The same quantity of calcium and magnesium as in example 1 was introduced, but in the form of 102 g of alloy containing 19% calcium and 38 g of an alloy containing 65% magnesium. The bismuth content changed from 0.2% at the start of the treatment to 0.1% after being maintained for one half-hour at 480° C. and then to approximately 0.06% after 4 hours, and finally to 0.01% after one hour of cooling at 330° C.

Example 4

Example 1 was reproduced by limiting the 480° C. maintenance period to 2 hours. The bismuth content was 0.15% at the end of said maintenance, and 0.05% after one hour of subsequent cooling at 330° C.

Example 5

Example 2 was reproduced by limiting the 480° C. maintenance period to 2 hours. The bismuth content was 0.1% at the end of said maintenance, and 0.05% after one hour of subsequent cooling at 330° C., as in example 4.

Example 6

Example 3 was reproduced by limiting the 480° C. maintenance period to 2 hours. The bismuth content was 0.1% at the end of said maintenance, but had reached 0.02% after one hour of subsequent cooling at 330° C. Therefore, it is observed that the simultaneous addition of two alloys according to the invention makes it possible to obtain, with respect to the prior art, an improved bismuth elimination rate for the same treatment time.

What is claimed is:

1. Method for eliminating bismuth from lead using magnesium and calcium, comprising introducing magnesium and calcium into molten lead in the form of lumps of first and second alloys comprising magnesium and calcium, the first alloy being a Mg—Ca alloy containing predominantly Mg and the second alloy being a Ca—Mg alloy containing predominantly Ca, each said alloy having a liquidus point below 650° C., the liquidus points of the first and second alloys being separated by less than 20° C.

2. Method according to claim 1, wherein the Mg—Ca alloy contains 12 to 25% by weight Ca, and the Ca—Mg alloy contains 60 to 60% by weight Ca.

3. Method according to claim 1, wherein the alloy lumps are introduced into the bath inside a cage.

4. Method according to claim 3, therein the Mg—Ca alloy contains 12 to 20% by weight Ca, and the Ca—Mg alloy contains 70 to 77% by weight Ca.

5. Method according to claim 1, wherein the alloy lumps are introduced into the bath using a vortex.

6. Method according to claim 5, wherein the Mg—Ca alloy contains 20 to 25% by weight Ca, and the Ca—Mg alloy contains 60 to 67% by weight Ca.

7. Method according to claim 1, wherein the lumps of the first and second alloys have different shapes or sizes.

8. Method according to claim 1, wherein each said alloy has a liquidus point less than 600° C.

* * * * *